United States Patent [19] [11] 3,888,089
Cooper [45] June 10, 1975

[54] VAPOR PRESSURE REGULATOR

[75] Inventor: Michael T. Cooper, Panama City, Fla.

[73] Assignee: The United States of Amercia as represented by the Secretary of the Navy, Washington, D.C.

[22] Filed: Feb. 11, 1974

[21] Appl. No.: 441,726

[52] U.S. Cl. .................. 62/50; 137/487; 137/487.5
[51] Int. Cl. .............................................. F17c 7/02
[58] Field of Search .......... 62/50, 51, 55; 137/487.5, 137/487

[56] References Cited
UNITED STATES PATENTS
2,515,835  7/1950  Preston ............................. 62/50 X
2,951,348  9/1960  Loveday et al. ...................... 62/50

Primary Examiner—William F. O'Dea
Assistant Examiner—Ronald C. Capossela
Attorney, Agent, or Firm—Richard S. Sciascia; Don D. Doty; Harvey A. David

[57] ABSTRACT

A vapor pressure regulator is disclosed of the type which allows the boiloff helium gas from the surface of liquid helium disposed in a dewar to be pressurized by a thermally processed expandable fluid to increase the vapor pressure of said boiloff helium gas to such a controlled extent that it can be vented into an ambient environmental medium that has a higher pressure than the vapor pressure of the helium in said dewar, without having a deleterious affect on the liquid helium in said dewar.

16 Claims, 2 Drawing Figures

3,888,089

VAPOR PRESSURE REGULATOR

STATEMENT OF GOVERNMENT INTEREST

The invention described herein may be manufactured and used by or for the Government of the United States of America for Governmental purposes without the payment of any royalties thereon or therefor.

FIELD OF THE INVENTION

The present invention relates, in general, to pressure regulators and, in particular, is a vapor pressure regulator. In even greater particularity, the invention consists of a method and means for receiving the boiloff gas from liquid helium contained in a dewar which is physically disposed in sea water of higher pressure than that of the vapor pressure of said boiloff helium gas in said dewar and for expelling said boiloff gas therefrom into the sea water ambient to said dewar while maintaining the desired pressure therein.

DESCRIPTION OF THE PRIOR ART

Heretofore, numerous gas pressure regulators, both complex and simple in structure, have been employed to regulate the downstream pressure of gas supplied by a pressurized container having an upstream gas pressure that is greater than the desired pressure of said downstream gas. As a matter of fact, such pressure regulators have been used, for example, in welding equipment, scuba diver breathing equipment, and the like with considerable success, so it does not appear to be necessary to belabor the point. However, to regulate the boiloff pressure of a gas of lower pressure into an object or into a medium of higher pressure is entirely another matter; and in the event the gas boiled off is gaseous helium that is boiled off of liquid helium disposed in a dewar, the pressure control thereof which allows it to be exhausted in water, sea water, or the like, of greater pressure becomes difficult, indeed.

Several systems have been employed to implement the exhausting of gas from a container of given pressure into an ambient medium of higher pressure.

One of such systems mechanically compresses the boiloff gas by means of piston or impeller type pumps to a higher pressure than that of the medium within which it is to be exhausted and then exhausts it therein. Unfortunately, such system has the disadvantage of being cumbersome, complex with numerous moving parts and, thus, is potentially unreliable. Furthermore, magnetic fields would probably emanate therefrom which would be deleterious to other operational procedures being conducted in proximity therewith at the same time, unless complex shielding thereof was employed.

Another of such systems involved the capturing of the boiloff gas as a result of adsorbing it with activated charcoal or charcoal supercooled by liquid nitrogen. However, so doing, too, has some disadvantages, in that a very large amount of charcoal would be required (the bulk of which would ordinarily be prohibited for most practical purposes), and it would have to be reactivated periodically if it is to be efficient and effective, which would be an inconvenience, indeed.

SUMMARY OF THE INVENTION

The instant invention overcomes many of the disadvantages of the known prior art, inasmuch as it is, relatively speaking, self-contained and compact, reliable with few moving parts, works almost automatically, and is comparatively easy and economical to construct, use maintain, transport, and store.

Briefly, the subject invention comprises structure fo increasing the pressure of the boiloff gas from liquid helium disposed in a dewar that is located within sea water — perhaps at considerable depths — during it; intended normal operation. Such pressurized helium gas is then optionally re-pressurized again and again, a; many times as is necessary to make the pressure thereo greater than that of the sea water at whatever depth op eration is occurring, so that it may be exhausted there into by the normal and natural process of going fron a higher pressure state to a lower pressure state.

It is, therefore, an object of this invention to provide an improved vapor pressure controller.

Another object of this invention is to provide an im proved method and means for effecting the exhaust o a gas of given pressure into an environmental medium of a higher pressure than said given pressure.

A further object of this invention is to provide an im proved method and means for maintaining the vapoi pressure over a continuously evaporating liquid a some pressure that is below that of a surrounding liquid or gaseous medium, be it environmental or otherwise be it natural or artificial.

Another object of this invention is to provide an im proved thermal gas compressor.

Still another object of this invention is to provide a more efficient system for enabling the boiloff helium gas from a liquid helium dewar to be expelled within a higher pressure medium, such as sea water or the like ambient thereto or remote therefrom.

A further object of this invention is to provide an im proved method and means for maintaining condition: such as will permit liquid helium or other liquid gases to exist, and thereby permit and sustain the operatior of underwater electrical superconducting devices.

Another object of this invention is to provide a pres sure relief method and means for the air or other gases used as life support atmospheres in underwater habi tats.

Another object of this invention is to provide a vapoi pressure controller that is easily and economically manufactured, used, maintained, transported, and stored.

Other objects and many of the attendant advantages will be readily appreciated as the subject invention be comes better understood by reference to the following detailed description, when considered in conjunctior with the accompanying drawings.

DESCRIPTION OF THE PREFERRED EMBODIMENT

Figures 1, 2:
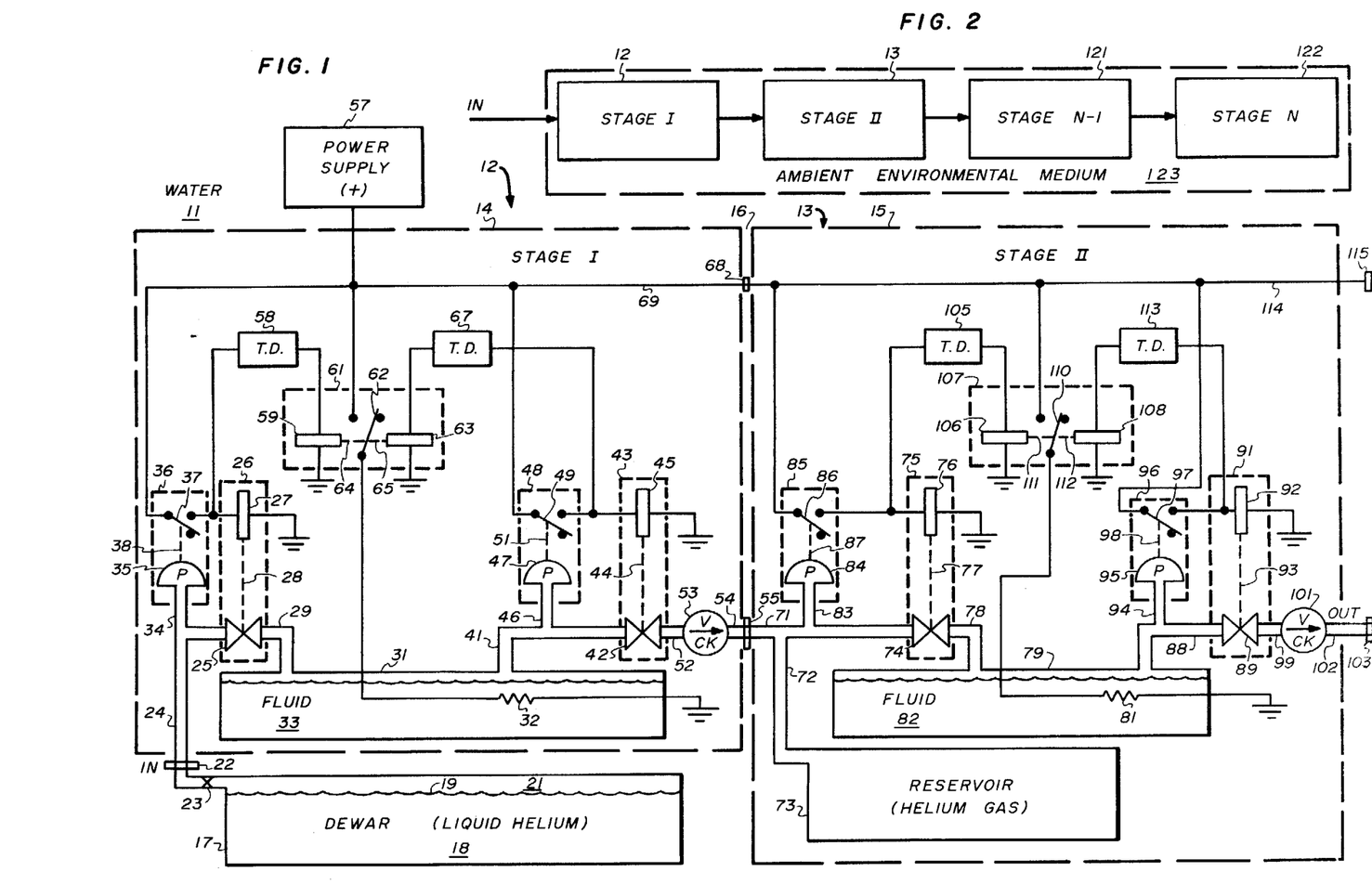
FIG. 1 is a combination block and schematic diagram of a two-stage vapor pressure control system constitut ing the preferred embodiment of the subject invention and FIG. 2 is a generalized block diagram of another spe cies of the invention which incorporates a plurality o series-connected vapor pressure control stages of the types depicted in FIG. 1, respectively.

Referring now to FIG. 1, the instant invention is illus trated as being deployed and used within water 11 which, of course, may be sea water, fresh water, brack ish water, or any other type of water or aqueous medium encountered during any given operational circumstances. This particular species thereof includes a first stage 12 and a second stage 13, each of which is operationally connected to the other in a manner discussed in more detail subsequently.

At this time, on the one hand, it should be understood that any suitable waterproof encapsulation means or housings 14 and 15 may be used to respectively contain said stages 12 and 13 as separate and detachable units, if so desired; on the other hand, if it were more advantageous to do so, both stages 12 and 13 may be encapsulated in a single, unitary waterproof housing 16. Obviously, it would be well within the purview of the artisan having the benefit of the teachings presented herewith to make whatever housing choices as are necessary to provide optimum operation of and physical protection for the invention during any given operational situation. Accordingly, so doing should not be considered as violating the scope or the spirit of the invention, even though the aforesaid housing 16 is schematically represented in FIG. 1.

As suggested above, the vapor pressure to be controlled may be that of any predetermined gas; nevertheless, in this particular instance — and, thus, without limitation — the gas whose vapor pressure is disclosed as being controlled is gaseous helium which has boiled off from liquid helium that partially fills a dewar, as is customary in the liquid helium containing art. Consequently, a conventional dewar 17 is schematically indicated as containing liquid helium 18, from the surface 19 of which boils off gaseous helium 21. Dewar 17 is, of course, a separate and distinct entity in this particular case, which is connected to the gas input of stage I by means of any suitable pipe coupling 22. Also, as is conventional, dewar 17 has a manual or other shut-off valve 23 located in its exit pipe, so that it may be conveniently stored, used separately, or replaced periodically in the event the helium therein becomes depleted, contaminated, or the like.

As previously suggested, dewar 17 is herewith depicted in the disclosed preferred embodiment of FIG. 1 as being located outside of housing 14; nevertheless, it should be understood that it may be disposed within housing 14, if so desired, or if operational circumstances dictate that the entire apparatus should be self-contained as a unitary device. Hence, the respective dispositions thereof will be left to the design choice of the artisan.

Coupling 22 is, of course, connected to an entrance pipe 24 which, in turn, is connected to the entrance end of a normally closed but controlled intake valve 25 of a solenoid valve 26 containing a solenoid actuator 27, the latter of which causes said valve 25 to be opened and closed by suitable linkage 28. The exit end of control valve 25 is connected by means of a transfer pipe 29 to the entrance end of a heatable pressurizing chamber 31, which contains (or, if so desired, is operationally associated with) an electrically energized heater 32 for the timely heating of an expandible fluid 33 contained therein.

Said expandible fluid may be any one of several, the selection of which will be left to the artisan, so that the subject invention will be optimized for any given operational circumstances. However, for example, liquid glycerine, having an volume coefficient of 0.4853 × $10^{-3}$ per °C with temperature, is quite satisfactory for such purpose. On the other hand, such fluids as olive oil, petroleum, phenol, turpentine, ether, acetone, pentane, among others, may also be used as fluid 33, if so desired. Obviously, it would be well within the purview of one skilled in the art having the benefit of the teachings presented herewith to make the proper selection of said fuid 33.

Entrance pipe 24 is also connected by means of a pressure sampling pipe 34 to a pressure actuator 35 of a pressure controlled switch 36 containing a normally open single throw-double pole switch 37 that has the throw thereof connected by a suitable mechanical linkage 38 to said pressure actuator 35 for timely movement thereby. Switch 36 is of the general type that is closed by a first preset pressure and opened by a second preset pressure that is lower than said first preset pressure, the pressure settings of which are selected for the operational circumstances involved. Such a switch may, of course, be obtained commercially from such companies as ASI Servo Systems, Inc., of Newark, N.J., Honeywell, Inc., of Minneapolis, Minn., and Ranco Company of Columbus, Ohio.

The exit end of the aforesaid heating chamber 31 is connected by means of a transfer pipe 41 to the entrance end of a normally closed control exhaust valve 42, the latter of which is part of a solenoid valve 43 that is opened and closed via linkage 44 by a solenoid actuator 45.

Also connected to said transfer pipe 41 is another gas pressure sampling pipe 46, to which is connected pressure actuator 47 of another pressure controlled switch 48 containing a normally open single throw-double pole switch 49 that has the throw thereof connected by suitable mechanical linkage 51 to said pressure actuator 47 for timely movement thereby. Switch 48, like switch 36, is of the general type that is closed by a first preset pressure and opened by a second preset pressure that is lower than said first preset pressure, the pressure settings of which are selected for the operational circumstances involved. Such a switch may, of course, be obtained commercially from such companies as ASI Servo Systems, Inc., of Newark, N.J., Honeywell, Inc., of Minneapolis, Minn., and Ranco Company of Columbus, Ohio.

The exit end of valve 42 is connected by means of a pipe 52 to the entrance end of a gas check valve 53, employed to prevent reverse gas or other flows, in the event Stage I is used alone, or in the event excessive back pressure happens to become built up for some reason or another.

If Stage I is used alone (as will be discussed later), a pipe 54 connected to the exit end of check valve 53 becomes the exhaust pipe thereof, and, thus, it extends into the ambient environmental medium — be it the aforementioned water 11, or some other environmental medium, such as sea water (that is, salt water), air, space, or the like, even though not specifically mentioned herein.

In the event that second stage 13 is necessary for optimum operation during any given operational circumstances, a pipe coupling 55 is conventionally connected to the exit end of exhaust pipe 54, so that said stage II may be easily connected thereto.

So far, the gas flow piping system has been predominantly discussed. Now the electrical system associated therewith will be explained in greater detail.

A power supply 57, preferably of the alternating current type but of any appropriate conventional type, is employed to supply positive electricity (relative to ground) to the electrical apparatus of the invention. It is illustrated in FIG. 1 as being located external to the waterproof housing 14; however, it should be understood that it may be located within said housing 14, if so desired, in order to make the entire invention self-contained, so as to, in turn, facilitate its being transported and used as a unitary system. Obviously, it would be within the capabilities of the artisan having the benefit of the teachings presented herewith to make such design choices, without violating the spirit or scope of the invention.

The positive output of power supply 57 is connected to the movable arm of switch 37 of pressure actuated switch 36. The terminal of switch 37 that would become electrically energized upon closure thereof is electrically connected to one of the leads of solenoid actuator 27, with the other lead thereof connected to ground. Said terminal is also connected to the input of an electrical time delay 58, the output of which is connected to the input electrical lead of a solenoid portion 59 of a lock stepping switch 61. The exit electrical lead of solenoid 59 is connected to ground.

Lock stepping switch 61 is of the type that closes a movable arm 62 thereof with the electrical contact thereof connected to the aforesaid power supply 57 upon electrical energization of solenoid 59, and which moves said arm out of contact with said electrical contact upon energization of another solenoid 63, the energization of which will be discussed more fully below. Suffice to say at this time, that solenoids 59 and 63 are connected to the movable arm of switch 61 by means of any suitable mechanical, electromagnetic, or other linkages 64 and 65, respectively.

Although the abovementioned lock stepping switch 61 may, per se, be designed by the artisan to suit his operational purposes, it may also be selected from one thereof (such as model no. 250-384-046) manufactured by LEDEX, Incorporated of Dayton, Ohio.

Power supply 57 is also connected to the normally open contact of switch 61 and the movable arm thereof is electrically connected to one terminal of the aforesaid heater 32 of heated pressurizing chamber 31, with the other terminal thereof connected to ground.

The positive output terminal of power supply 57 is also electrically connected to movable arm 49 of pressure actuated switch 48. The operative contact to which said movable arm 49 is put into contact by pressure actuator 47 and linkage 51 is electrically connected to the input of another electrical time delay 67, the output of which is electrically connected to the input of the aforesaid solenoid 63. Of course, the electrical output of solenoid 63 is connected to ground, as is the electrical output of the aforementioned solenoid 59.

The electrical contact which movable arm 49 of pressure actuated switch 48 is moved into contact is also connected to the electrical input of solenoid 45 of solenoid valve 43, with the electrical output thereof connected to ground.

The positive terminal of power supply 57 is also optionally connected to an electrical connector 68, preferably located outside of waterproof housing 14, so that the electrical system of stage II may be connected thereto, if so desired.

Of course, it should be understood that waterproofing or sealing means, such as packing glands or the like (not shown), should be used to allow all electrical wiring and mechanical piping to extend through the walls of housing 14, in the event the invention is submerged in water or some other contaminating ambient environmental medium. Hence, such packing glands or other sealing means should be used in association with one or both ends of power supply — electrical conductor line 69 — as the case may be — and the aforesaid exhaust pipe 54, where they extend through housing 14, respectively.

From the foregoing, it may readily be seen that Stage I constitutes a new and useful system, per se, which may either stand alone or be operated in conjunction with stage II, the latter of which will now be discussed in some detail.

Still referring to FIG. 1, second stage 13 is shown to be both electrically and pneumatically connected to connector 68 and coupling 55, respectively. As previously suggested, for some practical purposes, stage I alone may be adequate for effecting the exhaust of the helium gas boiled off of liquid helium in a dewar; therefore, stage II and all subsequent stages, if any, may be considered as being optional, depending upon operational circumstances.

As may readily be seen, pipe coupling 55 is connected to an entrance pipe 71 which, in turn, is connected to a pipe 72 leading to a reservoir 73 which, in this particular instance, happens to constitute a helium gas reservoir that will receive helium gas from entrance pipe 71 or supply helium gas to entrance pipe 71, depending upon the relative pressures thereof.

Entrance pipe 71 is also connected to the entrance end of a control valve 74 of a solenoid valve 75 containing a solenoid actuator 76 which is connected to valve 74 by any appropriate conventional linkage mechanism 77. The exit end of said control valve 74 is connected by means of a pipe transfer 78 to the entrance end of a heated pressurizing chamber 79, which, like chamber 31, contains an electrically energized heater 81 for the timely heating of an expandible fluid 82 contained therein.

Said expandible fluid may be any one of several, the selection of which will be left to the artisan, so that the subject invention will be optimized for any given operational circumstances. However, for example, liquid glycerine, having an expansion coefficient of $0.4853 \times 10^{-3}$ per °C with temperature, is quite satisfactory for such purpose. On the other hand, such fluids as olive oil, petroleum, phenol, turpentine, ether, acetone, pentane, among others, may also be used as fluid 82, if so desired. Obviously, it would be well within the purview of one skilled in the art having the benefit of the teachings presented herewith to make the proper selection of said fluid 82.

Entrance pipe 71 is also connected by means of a pressure sampling pipe 83 to a pressure actuator 84 of a pressure control switch 85 containing a normally open single throw-double pole switch 86 that has the throw thereof connected by suitable mechanical linkage 87 to said pressure actuator 84 for timely movement thereby. Switch 85 is, like switch 36, of the general type that is closed by a first preset pressure and opened by a second preset pressure that is lower than said first preset pressure, the pressure settings of which are selected for the operational circumstances involved. Such a switch may, of course, be obtained commercially from such companies as ASI Servo Systems, Inc., of Newark, N.J., Honeywell, Inc., of Minneapolis, Minn., and Ranco Company of Columbus, Ohio.

The exit end of the aforesaid heated pressurizing chamber 79 is connected by means of a transfer pipe 88 to the entrance of a control valve 89, the latter of which is part of a solenoid valve 91 having a solenoid actuator 92. Of course, said solenoid actuator 92 is connected to valve 89 by any appropriate linkage means 93 which will effect the proper actuation of said valve 89 by said solenoid 92.

Also connected to said transfer pipe 88 is another gas pressure sampling pipe 94, to which is connected pressure actuator 95 of another pressure controlled switch 96 containing a normally open single throw-double pole switch 97 that has the throw thereof connected by suitable mechanical linkage 98 to said pressure actuator 95 for timely movement thereby. Switch 96 is, of course, of the general type that is closed by a first preset pressure and opened by a second preset pressure that is lower than said first preset pressure, the pressure settings of which are selected for the operational circumstances involved. Such a switch may, of course, be obtained commercially from such companies as ASI Servo Systems, Inc., of Newark, N.J., Honeywell, Inc., of Minneapolis, Minn., and Ranco Company of Columbus, Ohio.

The exit end of valve 89 is connected by means of a pipe 99 to the entrance end of a gas check valve 101, employed to prevent reverse gas or other flows at that location within stage II, in the event said stage II is used as the final stage in a two stage embodiment of the subject invention, or in the event excessive back pressures happen to be built up as a result of stages I and II being combined with a third vapor pressure regulator stage (not shown in FIG. 1).

If stage II happens to be the final stage in a two stage embodiment of the invention, a pipe 102 connected to the exit end of check valve 101 becomes the exhaust pipe thereof, and, thus, it extends into the ambient environmental medium, regardless of what it may be. On the other hand, in the event a third stage is necessary for optimum operation during any given operational circumstances, a pipe coupling 103 is conventionally connected to the exit end of exhaust pipe 102, so that said third stage may be readily connected thereto at any desired time, including during manufacture and operations in the field.

Again, like in the previously discussed stage I, the gas flow piping system of stage II has now been predominantly discussed. Hence, the electrical system thereof which is associated with said gas flow piping system will now be explained in greater detail.

As a result of the electrical connection made by the aforementioned electrical connector 68, the aforesaid power supply 57 likewise supplies electrical power to stage II. However, although shown in such arrangement in this particular preferred embodiment, it should be understood that stage II may include its own power supply, if so desired, in the event it becomes necessary that it be a self-contained unitary stage which, for example, may be connected to stage I but physically disposed in some location remote thereto. Again, it would ostensively be obvious to one skilled in the art having the benefit of the teachings presented herewith to make such design choices, without violating the spirit or scope of the invention.

As shown in FIG. 1, the positive output of power supply 57 is effectively connected to the movable arm 86 of pressure actuated switch 85. The terminal of switch 85 that would become electrically energized upon closure thereof is electrically connected to one of the leads of solenoid 76, with the other lead thereof connected to ground. Said terminal is also connected to the input of an electrical time delay 105, the output of which is connected to the input electrical lead of a solenoid portion 106 of a lock stepping switch 107. The exit electrical lead from solenoid 106 is connected to ground.

Lock stepping switch 107 is of a type that is similar to the previously discussed lock stepping switch 61 and is of the type that closes the movable arm 110 thereof with the electrical contact thereof connected to the aforesaid power supply 57 upon electrical energization of solenoid 106, and which moves said arm out of contact with said electrical contact upon energization of another solenoid 108, the energization of which will be discussed subsequently. In any event, it should be understood at this time that solenoids 106 and 108 are connected to the movable arm 110 of switch 107 by means of any suitable mechanical, electromagnetic, or other linkages 111 and 112, respectively. Again, for purpose of emphasis, the above mentioned lock stepping switch 107 may be designed by the artisan to suit his operational purposes or it may be selected from one thereof (such as model no. 250-384-046) manufactured by LEDEX, Incorporated of Dayton, Ohio.

The positive output terminal of the aforesaid power supply 57 is also effectively electrically connected to the normally open electrical contact of switch 107, and the movable arm thereof is connected to one of the terminals of the aforementioned heater 81 disposed within (or, if so desired, operationally associated with) heated pressurizing chamber 79, with the other terminal thereof electrically connected to the ground.

The positive output terminal of power supply 57 is also effectively electrically connected to movable arm 97 of pressure actuated switch 96. The normally open operative contact thereof to which said movable arm 97 is put into contact by pressure actuator 95 and linkage 98 is electrically connected to the input of another time delay 113, the output of which is electrically connected to the input of the aforesaid solenoid 108. Of course, the electrical output of solenoid 108 is connected to ground, as is the electrical output of the aforementioned solenoid 106.

The electrical contact with which movable arm 97 of pressure actuated switch 96 is moved into contact is also connected to the electrical input of solenoid 92 of solenoid valve 91, with the electrical output thereof connected to ground.

In the event a third stage is to be connected to the output of stage II, an electrical wire 114 effectively connected to the aforementioned power supply 57 at one end thereof has the other end thereof connected to an electrical connector 115 (which is preferably identical to electrical connector 68).

Again, in order to waterproof housing 15 (or 16), suitable packing glands or seals (not shown) should be installed in the housing wall where said wire 114 and the aforesaid pipe 102 extends therethrough.

Referring now to FIG. 2, the generalized embodiment of the invention is disclosed as including stages I and II which are substantially identical to first and second stages 12 and 13 depicted in FIG. 1. Hence, they are identified by the same reference numerals. But, in addition, N-1 stage 121 and N stage 122 are illustrated as being series connected additional stages that may be used, if so desired, or if necessitated by operational circumstances. Of course, said stages 121 and 122 are both similar to previously disclosed second stage 13, as far as structure is concerned. And, obviously, although only four stages are shown in FIG. 2, any number thereof may be used in actual practice.

In the preferred embodiment of the invention depicted in FIG. 2, the four stages of the invention are illustrated in a general manner as being disposed within an ambient environmental medium 123. Such showing is, of course, intended to teach that the invention may be deployed and operated in any non-destructive environment, including water, sea water, the atmosphere, space, land, or whatever.

MODE OF OPERATION

The operation of the subject invention will now be discussed briefly in conjunction with both figures of the drawing. In addition, for purposes of convenience and simplification, it will be assumed that the well known ideal gas law — that is, $PV = WRT$ — will hold, and an idealized example thereof will be discussed, although it should be understood that numerous pressures, volumes, temperatures, etc., may be selected, with satisfactory results obtained therefrom during some operational environment situations.

Referring again to FIG. 1, it will also be assumed that in the beginning, in the quiescent state, with the heaters off, the entire system will be at the temperature of the ambient medium. In dewar 17, helium gas 21 boils off surface 19 of liquid helium 18, and becomes warmer and less dense. As helium gas 21 flows through open shut-off valve 23, through entrance pipe 24 and into pressure sampling pipe 34, its pressure increases therein, because at this time valve 25 is still closed. Once the helium gas pressure exceeds the upper presetting of pressure switch 36, pressure actuator 35, via mechanism linkage 38, causes normally open switch 36 to close, thereby supplying electrical power to solenoid 27, the energization of which opens said valve 25 by means of linkage 28. The opening of valve 25 permits the expanding helium gas to travel through transfer pipe 29 and fill that portion of chamber 31 not occupied by fluid 33. As heatable chamber 31 becomes so filled with helium gas, the pressure therein is increased; however, due to said filling thereof, the pressure in entrance pipe 24 — and, hence, in sampling pipe 34 — decreases to a value below the lower set pressure of pressure switch 36, and pressure actuator 35, thus, at that time, allows switch 37 to open. The opening of switch 37 de-energizes solenoid 27, thereby effecting the closure of valve 25.

As a result of the aforementioned closure of switch 37, electrical power was also supplied to time delay 58. Thus, after a predetermined time period, time delay 58 supplies electrical energy to solenoid actuator 59 of lock stepping switch 61, thereby effecting the timely closure of switch 62. Of course, closure of switch 62 causes heater 32 of heating chamber 31 to be electrically connected to power supply 57 for energization thereby, which, in turn, causes the heating of fluid 33 located in chamber 31 at that particular time. Because the temperature of said fluid 33 is increased by heater 32, it expands and causes the helium within chamber 31 to be compressed to a higher pressure. Of course, such increase in helium gas pressure is proportional to the type of fluid 33 employed, the fixed volume that occurs in chamber 31 when valves 25 and 42 are closed, and the amount of heat applied to said fluid 33 by heater 32. Then, because the pressure of the helium gas is thus increased, the helium gas pressure in transfer pipe 41 and sampling pipe 46 likewise increases to the preset upper level where pressure actuator 47 of pressure switch 48 causes switch 49 thereof to be closed. Closure of switch 49 causes solenoid 45 of solenoid valve 43 to be energized by power supply 57 and open valve 42, thereby allowing the increased pressure helium gas to pass through transfer pipe 52, check valve 53, exhaust pipe 54, and either into the aforementioned ambient water 11, in the event only a single stage is employed, or through pipe coupling 55 into second stage 13, in the event a second stage is required to build up the pressure of the exhaust helium gas sufficiently to enable it to be exhausted into said ambient environmental water.

For many practical purposes, the exhaust pressure of the helium gas from stage I will be sufficiently higher than the pressure of the ambient environmental medium, after the aforementioned processing thereof, and, in such case, the exhausting thereof is somewhat simplified, because only one vapor pressure regulator is required. However, in the event the ambient medium pressure still exceeds that of the helium gas in exhaust pipe 54, check valve 53 prevents any reverse flow from taking place, thereby preventing the ambient environmental medium from flowing back into and through stage I. Of course, as indicated above, stage II is connected, both electrically and mechanically, to the outputs of stage I. In such case, electrical conductor 114 is connected to electrical conductor 69 by means of electrical connector 68; and entrance pipe 71 is connected to exhaust pipe 54 by means of pipe coupling 55, thereby putting stage II in an operable condition.

As the pressurized helium gas from exhaust pipe 54 passes into stage II, it fills reservoir 73. But, the pressure in reservoir 73 increases as it is filled with more and more helium gas. Eventually, because valve 74 is normally closed, the pressure thereof and, thus, the pressure in entrance pipe 71 and sampling pipe 83 reaches the upper setting level of pressure actuator 84 of pressure switch 85, and normally open switch 86 thereof is closed thereby via linkage 87. Hence, electrical power from power supply 57 is supplied to time delay 105 and solenoid 76 of solenoid valve 75, the energization of which opens said valve 74 by means of linkage 77.

The opening of the aforesaid valve 74, of course, permits the expanding helium gas to travel through pipe 78 into heatable pressurizing chamber 79, where fluid 82 (like the aforementioned fluid 33) is heated in a timely manner by electric heater 81. As that part of chamber 79 not filled by fluid 82 becomes filled with helium gas, the pressure therein is increased; however, due to said filling of chamber 79, the pressure in entrance pipe 71 — and, therefore, in sampling pipe 83 — decreases to value that is below the lower pressure setting of pressure valve 85, and, thus, pressure actuator 84, at that time, allows switch 86 to open. The opening of switch 86 de-energizes solenoid 76, thereby effecting the closure of valve 74.

As a result of the aforementioned closure of switch 86, electrical power was also supplied to time delay 105. Thus, after a predetermined time, time delay 105 supplies electrical energy to solenoid actuator 106 of lock stepping switch 107, thereby effecting the timely closure of switch 110. Of course, closure of switch 110 causes heater 81 of chamber 79 to be electrically connected to power supply 57 for energization thereby, which, in turn, causes the heating of fluid 82 located in said chamber 79. Because the temperature of said fluid 82 is increased by heater 81, the volume thereof is increased, and because the volume thereof increases, the helium is compressed to a higher pressure in chamber 79. Then, the helium gas pressure likewise increases to the upper level where pressure actuator 95 causes switch 96 to be closed. Closure of switch 96 causes solenoid 92 of solenoid valve 91 to be energized by power supply 57 and open valve 89 by means of linkage 93, thereby allowing the increased pressure helium gas to pass through transfer pipe 99, check valve 101, exhaust pipe 102, and either into the aforementioned ambient environmental medium (water 11) or, in the alternative, into a third stage, in the event such third stage is necessary to build up the pressure even further, so that the exhaust helium gas will have a pressure that is greater than that of said ambient medium and, hence, will readily exhaust thereinto.

As may readily be seen, stage II is substantially identical to stage I, with the exception that stage II includes a permanent reservoir 73, while stage I is connected to any portable liquid helium dewar 17. Moreover, it should be understood, that the various and sundry upper and lower pressure settings of pressure switches 36, 48, 85, and 96, as well as the various and sundry time delays of time delays 58, 67, 105, and 113 are selected in such manner as will enable the subject invention to be used within an environmental medium having any predetermined pressure. Hence, it may readily be seen that the respective values of the immediately preceding elements would have to be properly designed to take into consideration the ambient pressure of the water, sea water, or the like, the pressure of which is, of course, contingent upon the depth involved. Obviously, it would be well within the purview of one skilled in the art having the benefit of the teachings presented herewith to make the proper design parameter selections for said elements, respectively, so that they will operate in combination with the other elements of the subject invention in an optimum manner.

Referring now to FIG. 2, it may readily be seen that it includes a pair of stages 12 and 13 which are identical to the first and second stages of the device of FIG. 1. In addition, stages 121 and 122 are shown as being connected in series therewith, in order to provide the teaching that any number of stages may be incorporated in the subject invention without violating the scope or the spirit thereof. Furthermore, said stages 12, 13, 121, and 122 are depicted as being deployed within an ambient environmental medium 123, which is intended to be without limitation, so that it will be readily understood that the instant invention may be used within any environment that is not sufficiently hostile to destroy it physically.

Again, like the system shown in FIG. 1, the input to the system of FIG. 2 is primarily intended to have a liquid helium dewar connected thereto. Nevertheless, it should be understood that any suitable container containing any liquid or gas having a pressure which is exceeded by that of the environmental medium may be connected to the input of stage I, processed through the entire system of FIG. 2, so as to allow the exhaust gases thereof to be exhausted into said ambient environmental medium 123, even though the pressure of said ambient environmental medium 123 may be greater than that of the liquid or gas located in the container connected to the input of stage I. Of course, such teachings are intended to generalize and, thus, broaden the scope of operation of the invention considerably.

At this time, it would appear to be noteworthy that all of the individual elements and components incorporated in the instant invention are, per se, well known, conventional, and commercially available. It is, therefore, to be understood that it is their unique interconnections and interactions which effect the new and useful combination of elements constituting this invention.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A vapor pressure regulator, comprising in combination:

means adapted for being connected to a container for receiving the vapor of a predetermined substance contained therein;

means, having an input and an output, adapted for containing a given liquid within a portion of the volume thereof;

a liquid, having a coefficient of expansion such that a volume thereof is increased with temperature and decreases with decreased temperature, disposed within said portion of the volume of the aforesaid containing means;

a first normally closed valve means, connected between the output of said receiving means and the input of said containing means, adapted for being opened in response to a first signal, so as to timely allow the aforesaid vapor to pass from said receiving means into that portion of said containing means not occupied by said given liquid and effectively in contact therewith;

a second normally closed valve means, having an input and an output, with the input thereof connected to the output of said containing means, adapted for being timely opened in response to a second signal, so as to timely allow the aforesaid vapor to pass out of said containing means;

means disposed in proximity with the aforesaid given liquid disposed within a portion of the volume of said containing means for the timely heating thereof in response to a third signal;

means connected to said receiving means and said first normally closed valve means for supplying said first signal thereto in response to a first vapor pressure within said receiving means and for removing said first signal therefrom in response to a second vapor pressure within said receiving means that is lower than said first vapor pressure;

means connected to the output of said containing means and said second normally closed valve means for supplying said second signal thereto in response to a third vapor pressure within said containing means and for removing said second signal therefrom in response to a fourth vapor pressure within said containing means that is lower than said third vapor pressure;

means connected to the output of said second normally closed valve means for exhausting the vapor from said container means whenever said second signal is supplied to said second normally closed valve means; and means connected to said first and second signal supplying means and to said liquid heating means for supplying said third signal to said liquid heating means in accordance with a predetermined program and at such times that said first and second signals are not present at their respective first and second normally closed valve means.

2. The device of claim 1, wherein said predetermined substance is liquid helium.

3. The invention of claim 2, further characterized by means effectively surrounding said containing means, said first and second normally closed valve means, said liquid heating means, portions of said vapor receiving and exhausting means, and said first, second, and third signal supplying means for the housing thereof as a fluid tight encapsulated configuration.

4. The device of claim 1, wherein said means adapted for being connected to a container for receiving the vapor of a predetermined substance contained therein comprises a pipe having a pipe coupling attached to the entrance end thereof.

5. The device of claim 1, wherein said means, having an input and an output, adapted for containing a given liquid within a portion of the volume thereof comprises a heatable pressurizing chamber.

6. The device of claim 1, wherein said liquid, having a coefficient of expansion such that a volume thereof is increased with temperature and decreases with temperature, disposed within said portion of the volume of the aforesaid containing means is glycerine.

7. The device of claim 1, wherein said first normally closed valve means, connected between the output of said receiving means and the input of said containing means, adapted for being opened in response to a first signal, so as to timely allow the aforesaid vapor to pass from said receiving means into that portion of said containing means not occupied by said given liquid and effectively in contact therewith comprises a solenoid actuated valve.

8. The device of claim 1, wherein said second normally closed valve means, having an input and an output, with the input thereof connected to the output of said confining means, adapted for being timely opened in response to a second signal, so as to timely allow the aforesaid vapor to pass out of said containing means comprises a solenoid actuated valve.

9. The device of claim 1, wherein said means disposed in proximity with the aforesaid given liquid disposed within a portion of the volume of said containing means for the timely heating thereof in response to a third signal comprises an electrical heater.

10. The device of claim 1, wherein said means connected to said receiving means and said first normally closed valve means for supplying said first signal thereto in response to a first vapor pressure within said receiving means and for removing said first signal therefrom in response to a second vapor pressure within said receiving means that is lower than said first vapor pressure comprises:

a power supply; and a pressure actuated switch having a pressure actuator and a normally open switch, with the pressure actuator thereof connected to said receiving means, and with the normally open switch thereof connected between said power supply and the aforesaid first normally closed valve means.

11. The device of claim 1, wherein said means connected to the output of said containing means and said second normally closed valve means for supplying said second signal thereto in response to a third vapor pressure within said containing means and for removing said second signal therefrom in response to a fourth vapor pressure within said containing means that is lower than said third vapor pressure comprises:

a power supply; and a pressure actuated switch having a pressure actuator and a normally open switch, with the pressure actuator thereof connected to said containing means, and with the normally open switch thereof connected between said power supply and the aforesaid second normally closed valve means.

12. The device of claim 1, wherein said means connected to the output of said second normally closed valve means for exhausting the vapor from said container means whenever said second signal is supplied to said second normally closed valve means comprises an exhaust pipe.

13. The device of claim 1, wherein said means connected to the output of said second normally closed valve means for exhausting the vapor from said container means whenever said second signal is supplied to said second normally closed valve means comprises:

an exhaust pipe; and a check valve effectively connected between the output of said second normally closed valve means and said exhaust pipe.

14. The device of claim 1, wherein said means connected to said first and second signal supplying means and to said liquid heating means for supplying said third signal to said liquid heating means in accordance with a predetermined program and at such times that said first and second signals are not present at their respective first and second normally closed valve means comprises;

a power supply;

a ground;

a normally open switch connected between said liquid heating means and said power supply;

a first solenoid having a mechanical output and a pair of electrical terminals, with the mechanical output thereof connected to said normally open switch in such manner as to timely effect the closure thereof upon energization of said first solenoid, and with one of the electrical terminals thereof connected to said ground;

a first time delay means connected between the other electrical terminal of said first solenoid and the aforesaid first signal supplying means;

a second solenoid having a mechanical output and a pair of electrical terminals, with the mechanical output thereof connected to said normally open switch in such manner as to timely effect the opening thereof upon energization of said second solenoid, and with one of the electrical terminals thereof connected to said ground; and a second time delay means connected between the other electrical terminal of said second solenoid and the aforesaid second signal supplying means.

15. A vapor pressure regulator, comprising in combination:

entrance pipe means adapted for being connected to a vessel containing the vapor the pressure of which is to be regulated;

a first vapor pressure sampling pipe connected to said entrance pipe means;

a first normally open pressure actuated switch connected to said first vapor pressure sampling pipe means and preset to be closed in response to a first predetermined pressure therein and opened at a second predetermined pressure therein that is less than said first predetermined pressure;

a first normally closed solenoid actuated valve connected to the output of said entrance pipe means;

a heating chamber effectively connected to the output of said first normally closed solenoid actuated valve;

a liquid that expands and contracts in volume with temperature disposed within a predetermined portion of said heating chamber;

an electric heater means disposed in proximity with said liquid for the timely heating thereof;

a first transfer pipe connected to the output of said heating chamber;

a second normally closed solenoid actuated valve connected to the output of said first transfer pipe;

a second vapor pressure sampling pipe means connected to said first transfer pipe;

a second normally open pressure actuated switch connected to said second vapor pressure sampling pipe means and preset to be closed in response to a third predetermined pressure therein and opened in response to a fourth predetermined pressure that is lower than said third predetermined pressure;

a check valve means connected to the output of said second normally closed solenoid actuated valve;

exhaust pipe means connected to the output of said check valve means;

an electrical power supply;

a first electrical conductor connected between the output of said electrical power supply and one terminal of said first normally open pressure actuated switch;

a first time delay means for delaying the passing of electrical current therethrough for a first predetermined time period;

a second electrical conductor connected to the input terminals of said first time delay means and the solenoid of the aforesaid first normally closed solenoid actuated valve;

a stable switch means having a normally open switch, a first solenoid for effecting the closing of said switch, and a second solenoid for effecting the opening of said switch;

a third electrical conductor connected between the output terminal of said first time delay means and the input terminal of the first solenoid of said stable switch means;

a fourth electrical conductor connected between the output of the aforesaid power supply and one terminal of the switch of the aforesaid stable switch means;

a fifth electrical conductor connected between the other terminal of the switch of said stable switch means and one terminal of the aforesaid electric heater means;

a second time delay means for delaying the passing of electrical current therethrough for a second predetermined time period;

a sixth electrical conductor connected between one terminal of said second normally open pressure actuated switch, the input terminal of said second time delay means, and to the input terminal of the solenoid of said second normally closed solenoid actuated valve;

a seventh electrical conductor connected between the output of said second time delay and the input of said second solenoid of the aforesaid stable switch means;

an eighth electrical conductor connected between the other terminal of the switch of said second normally open pressure actuated switch and the output of the aforesaid power supply; and a ground electrically connected to the output terminals of each of the solenoids of said first solenoid actuated valve, said stable switch means, and the aforesaid second solenoid actuated valve, and to the other terminal of said electric heating means.

16. A pressure regulator system for exhausting the vapor of a substance having a predetermined pressure into a medium having a pressure that is greater than the predetermined pressure of said substance, comprising in combination:

a plurality of series connected vapor pressure regulators, each of which include:

means adapted for being connected to a container for receiving the vapor of a predetermined substance contained therein;

means, having an input and an output, adapted for containing a given liquid within a portion of the volume thereof;

a liquid, having a coefficient of expansion such that a volume thereof is increased with temperature and decreases with decreased temperature, disposed within said portion of the volume of the aforesaid containing means;

a first normally closed valve means, connected between the output of said receiving means and the input of said containing means, adapted for being opened in response to a first signal, so as to timely allow the aforesaid vapor to pass from said receiving means into that portion of said containing means not occupied by said given liquid and effectively in contact therewith;

a second normally closed valve means, having an input and an output, with the input thereof connected to the output of said containing means, adapted for being timely opened in response to a second signal, so as to timely allow the aforesaid vapor to pass out of said containing means;

means disposed in proximity with the aforesaid given liquid disposed within a portion of the volume of said containing means for the timely heating thereof in response to a third signal;

means connected to said receiving means and said first normally closed valve means for supplying said first signal thereto in response to a first vapor pressure within said receiving means and for removing said first signal therefrom in response to a second vapor pressure within said receiving means that is lower than said first vapor pressure;

means connected to the output of said containing means and said second normally closed valve means for supplying said second signal thereto in response to a third vapor pressure within said containing means and for removing said second signal therefrom in response to a fourth vapor pressure within said containing means that is lower than said third vapor pressure;

means connected to the output of said second normally closed valve means for exhausting the vapor from said container means whenever said second signal is supplied to said second normally closed valve means; and means connected to said first and second signal supplying means and to said liquid heating means for supplying said third signal to said liquid heating means in accordance with a predetermined program and at such times that said first and second signals are not present at their respective first and second normally closed valve means.

* * * * *